United States Patent [19]
Kallner

[11] Patent Number: 5,445,053
[45] Date of Patent: Aug. 29, 1995

[54] SHEET CUTTING AND PLACING APPARATUS, RELATED METHOD, AND RELATED PACKAGE

[75] Inventor: David J. Kallner, Coral Springs, Fla.

[73] Assignee: Mima Incorporated, Glenview, Ill.

[21] Appl. No.: 217,274

[22] Filed: Mar. 24, 1994

[51] Int. Cl.⁶ ........................................... B65H 35/00
[52] U.S. Cl. ............................................ 83/23; 83/94; 83/153; 83/277; 83/375; 83/651.100
[58] Field of Search .................. 83/206, 277, 023, 94, 83/151, 153, 651.1, 375

[56] References Cited

U.S. PATENT DOCUMENTS

| | | | |
|---|---|---|---|
| 3,672,250 | 6/1972 | Creffield | 83/277 |
| 3,701,299 | 10/1972 | Stumpf | 83/277 |
| 3,823,629 | 7/1974 | Bleimund | 83/277 |
| 3,830,121 | 8/1974 | Makeev et al. | 83/94 |
| 3,831,472 | 8/1974 | Sasaki | 83/277 |
| 3,991,926 | 11/1976 | Marks | 83/153 |
| 4,079,645 | 3/1978 | Nunes et al. | 83/277 |
| 4,356,054 | 10/1982 | Gotz | 83/277 |
| 4,512,227 | 4/1985 | Salvagnini | 83/277 |
| 4,516,458 | 5/1985 | Pomerantz et al. | 83/651.1 |
| 4,610,653 | 9/1986 | Savich | 83/651.1 |
| 4,989,851 | 2/1991 | Maede et al. | 83/277 |
| 5,245,899 | 9/1993 | Rohe | 83/206 |
| 5,375,493 | 12/1994 | Focke | 83/153 |

*Primary Examiner*—Kenneth E. Peterson
*Attorney, Agent, or Firm*—Schwartz & Weinrieb

[57] ABSTRACT

An apparatus and a related method are disclosed for cutting a sheet from flexible film wound on a roll and for placing the sheet on a pallet or on a layer of one or more boxes on the pallet. The roll is mounted so that it is rotatable about an axis parallel to one end of the pallet. A leading end of the film is gripped. The gripped end is pulled away from the roll. As the roll is thus rotated, a portion of the film is unwound from the roll. Also, at least a substantial part of the unwound portion is extended over the pallet or over a layer of boxes on the pallet. The unwound portion at a position is clamped between the pallet and the roll. The clamped portion is cut so as to cut a sheet having a predetermined length from the remaining film. The gripped end is released after the sheet has been cut therefrom so as to permit the sheet to drop onto the pallet or onto a layer of one or more boxes or other articles on the pallet. The gripped end may be lowered toward the pallet before the gripped end is released. A related package employing film sheets interposed respectively between the pallet and the lowermost layer of boxes or articles and between the respective layers of boxes or articles and employing a film sheet wrapping the pallet and the stacked layers of boxes or articles in a spiral pattern enveloping draped portions of the interposed sheets is also disclosed.

17 Claims, 9 Drawing Sheets

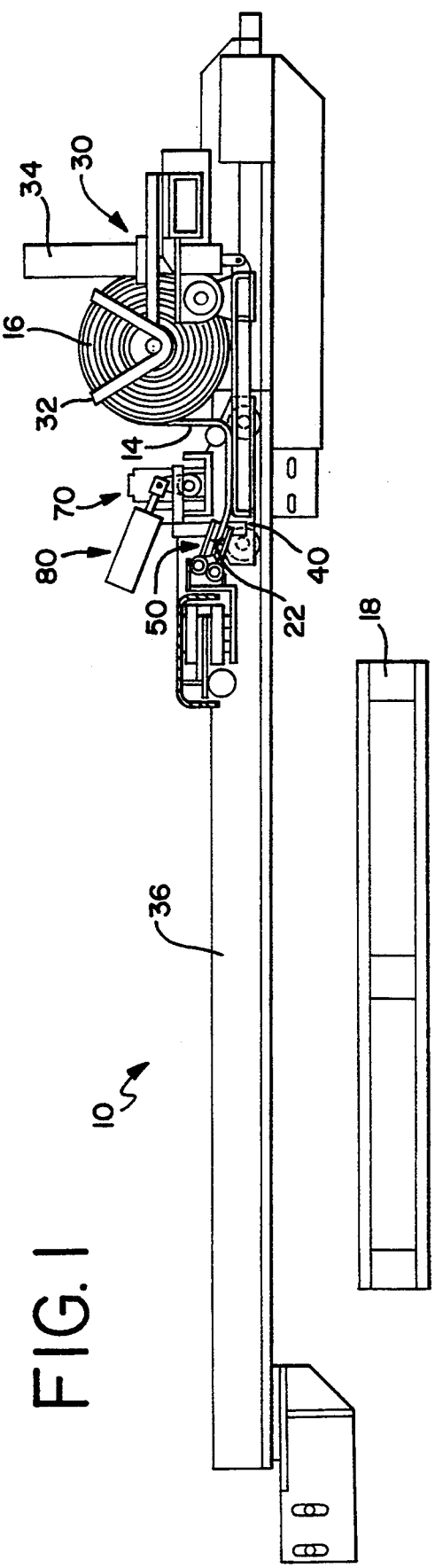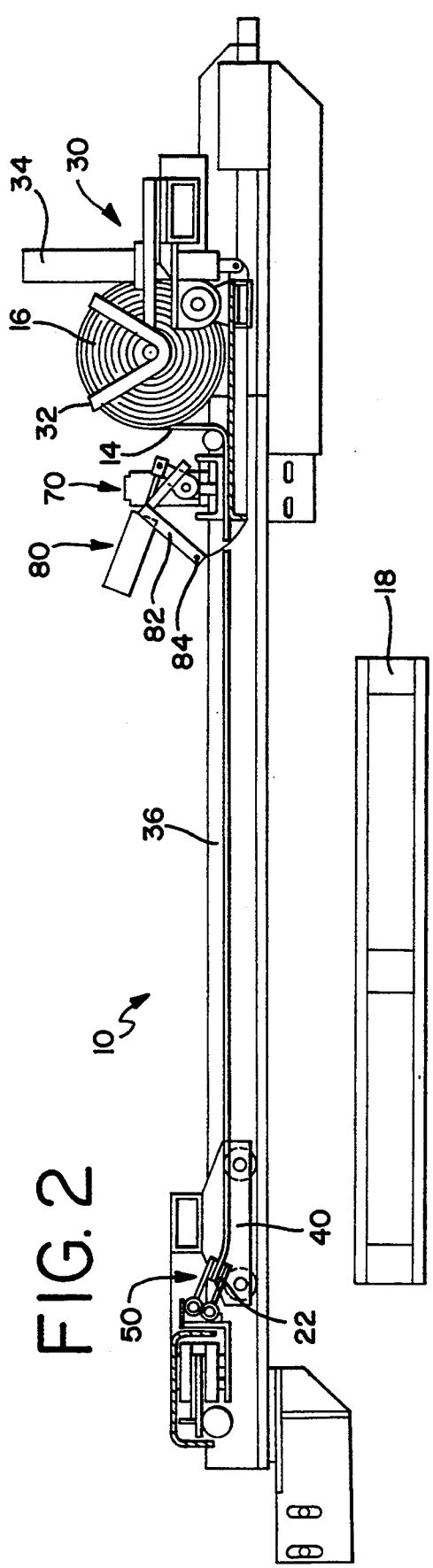

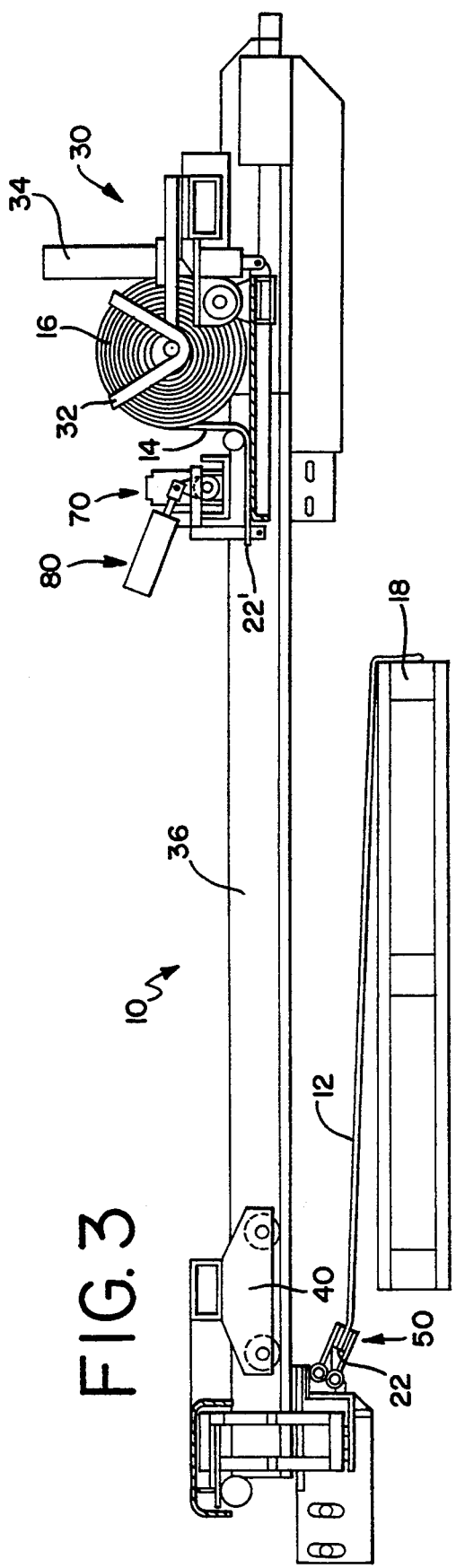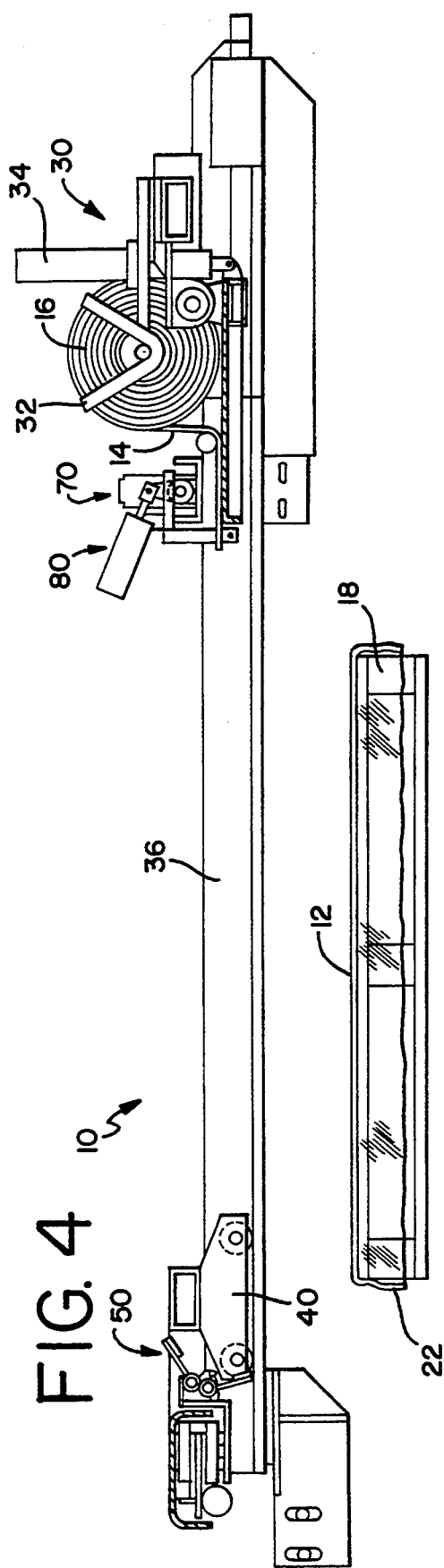

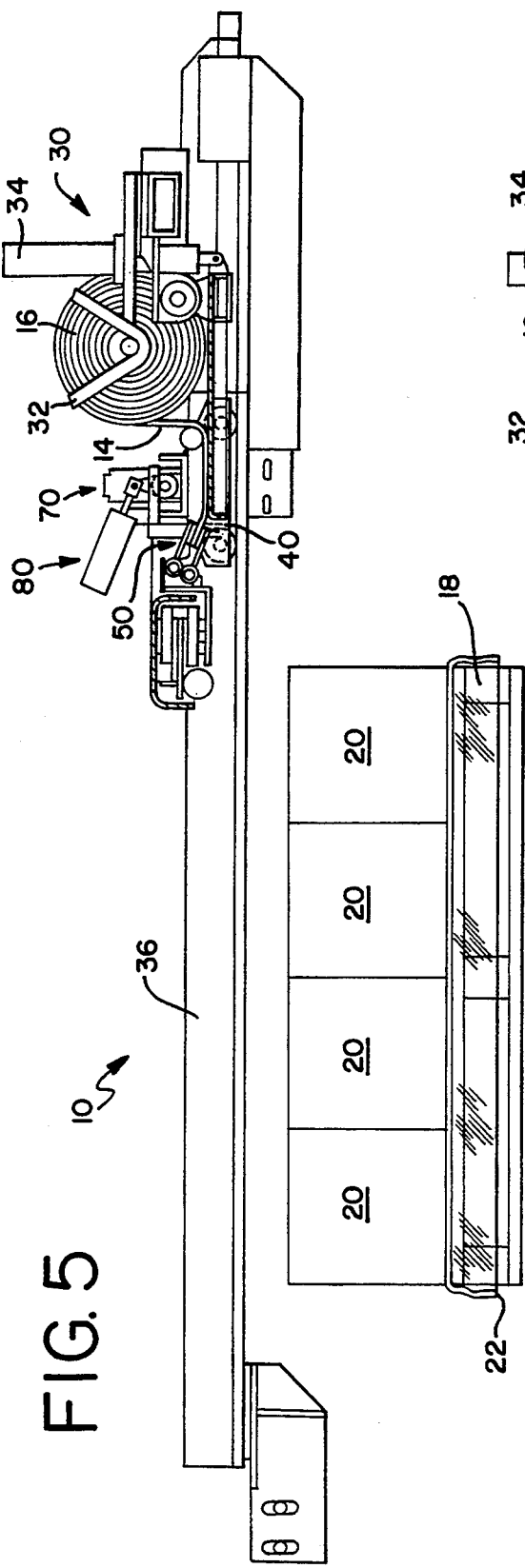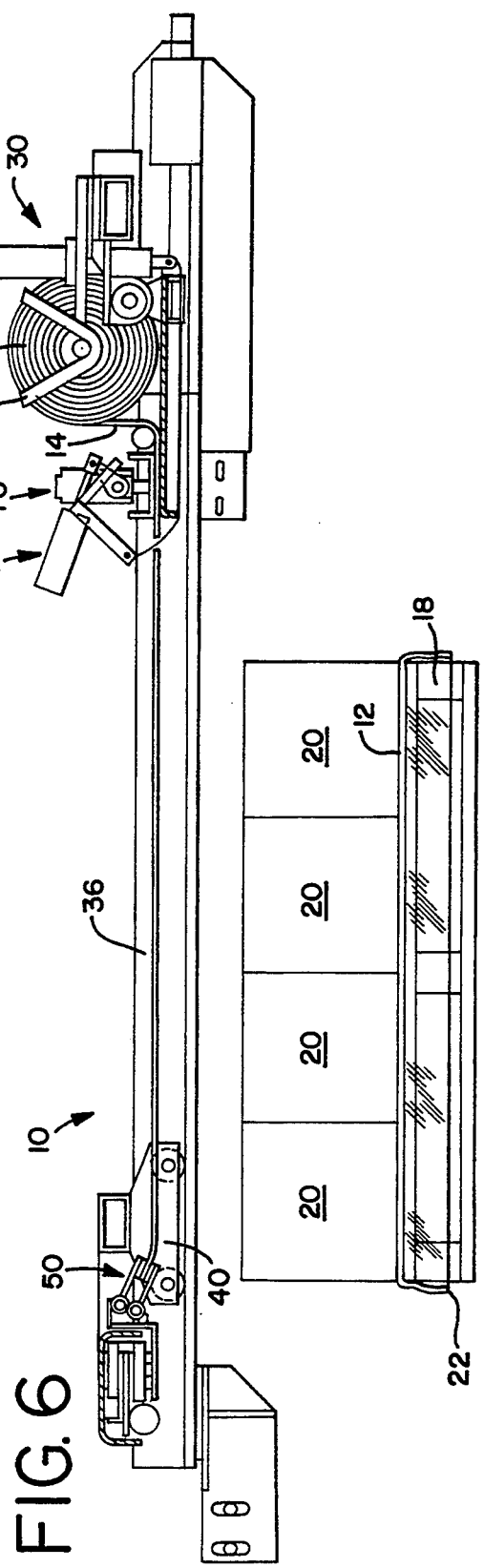

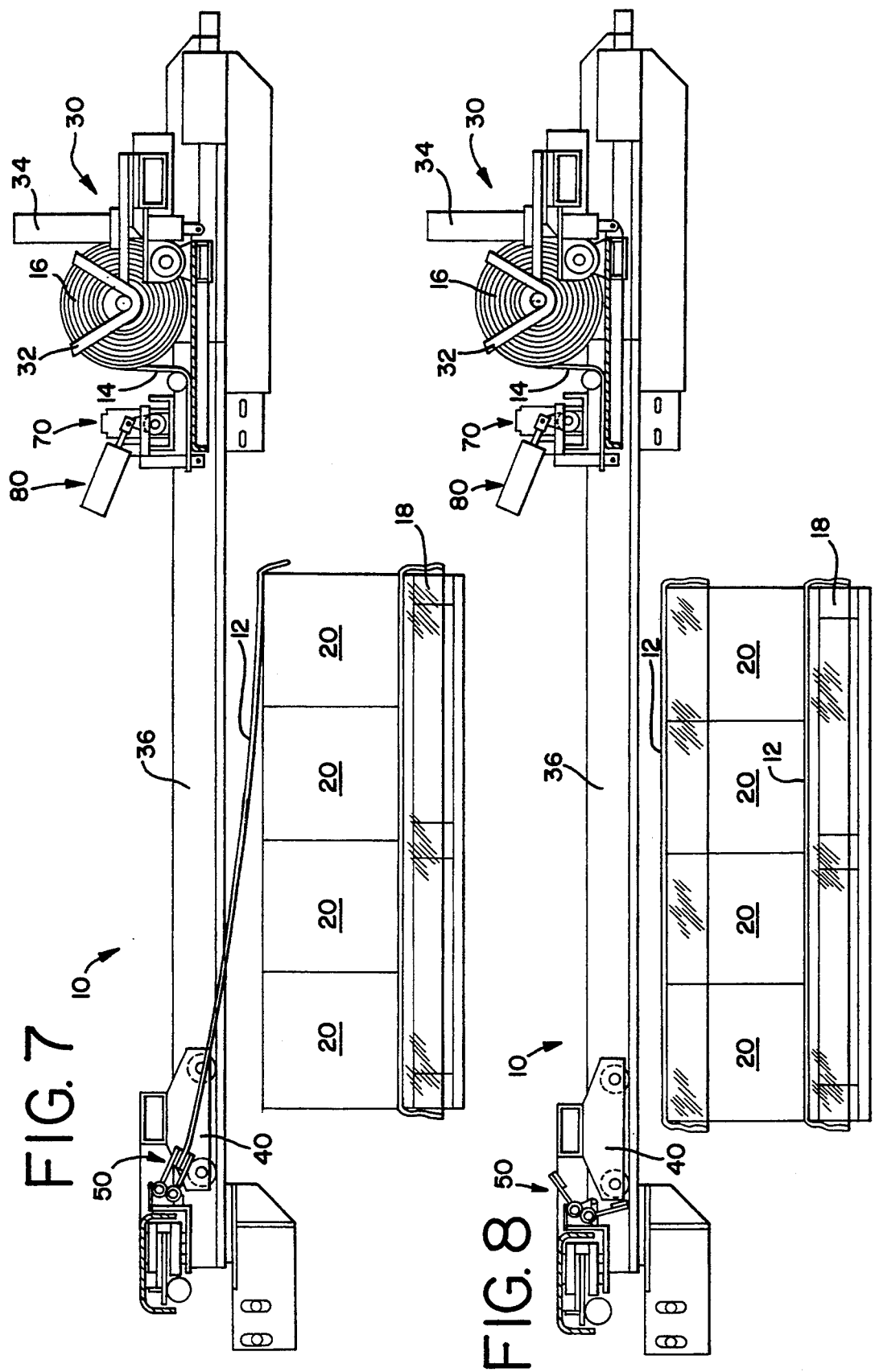

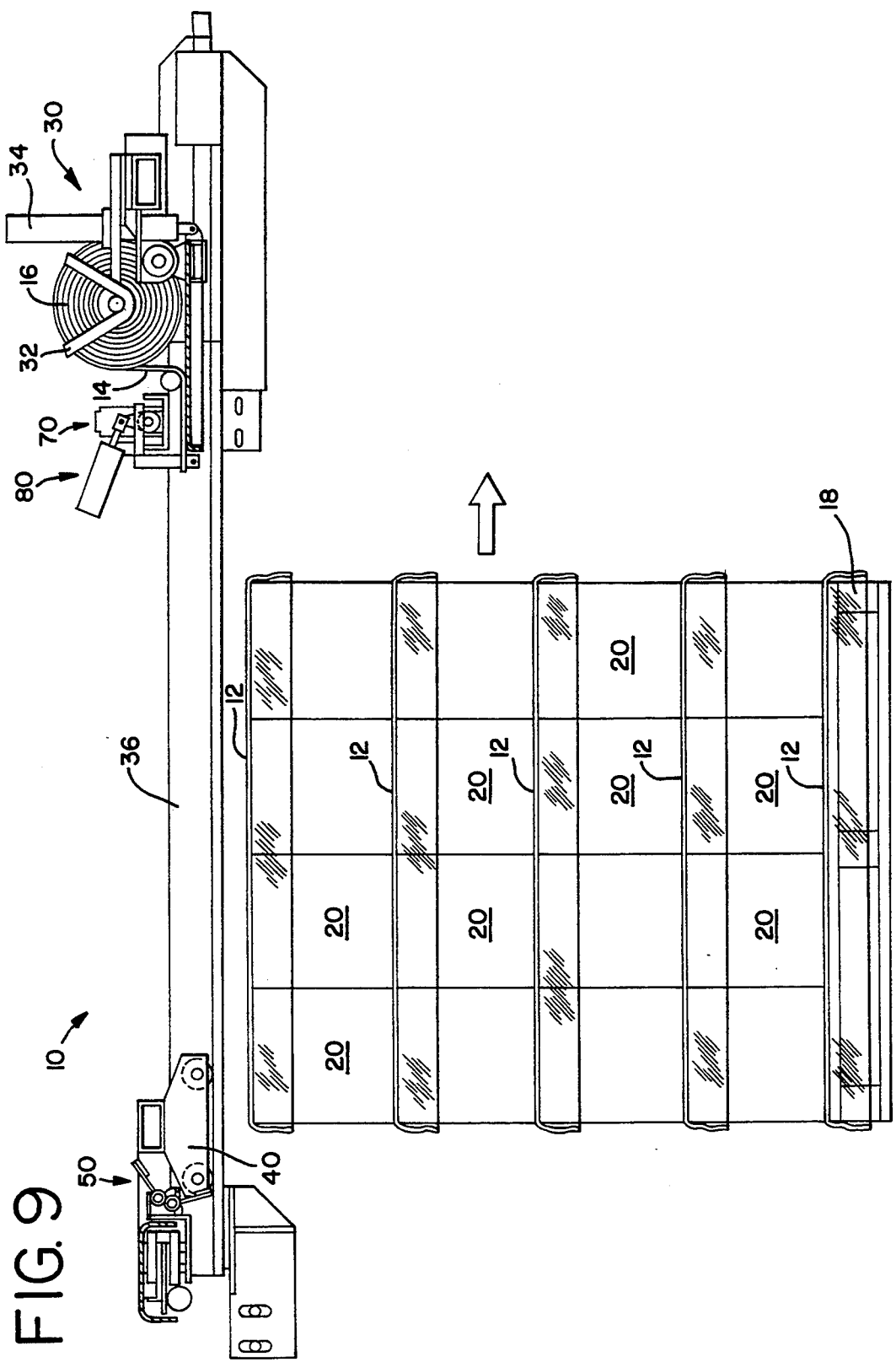

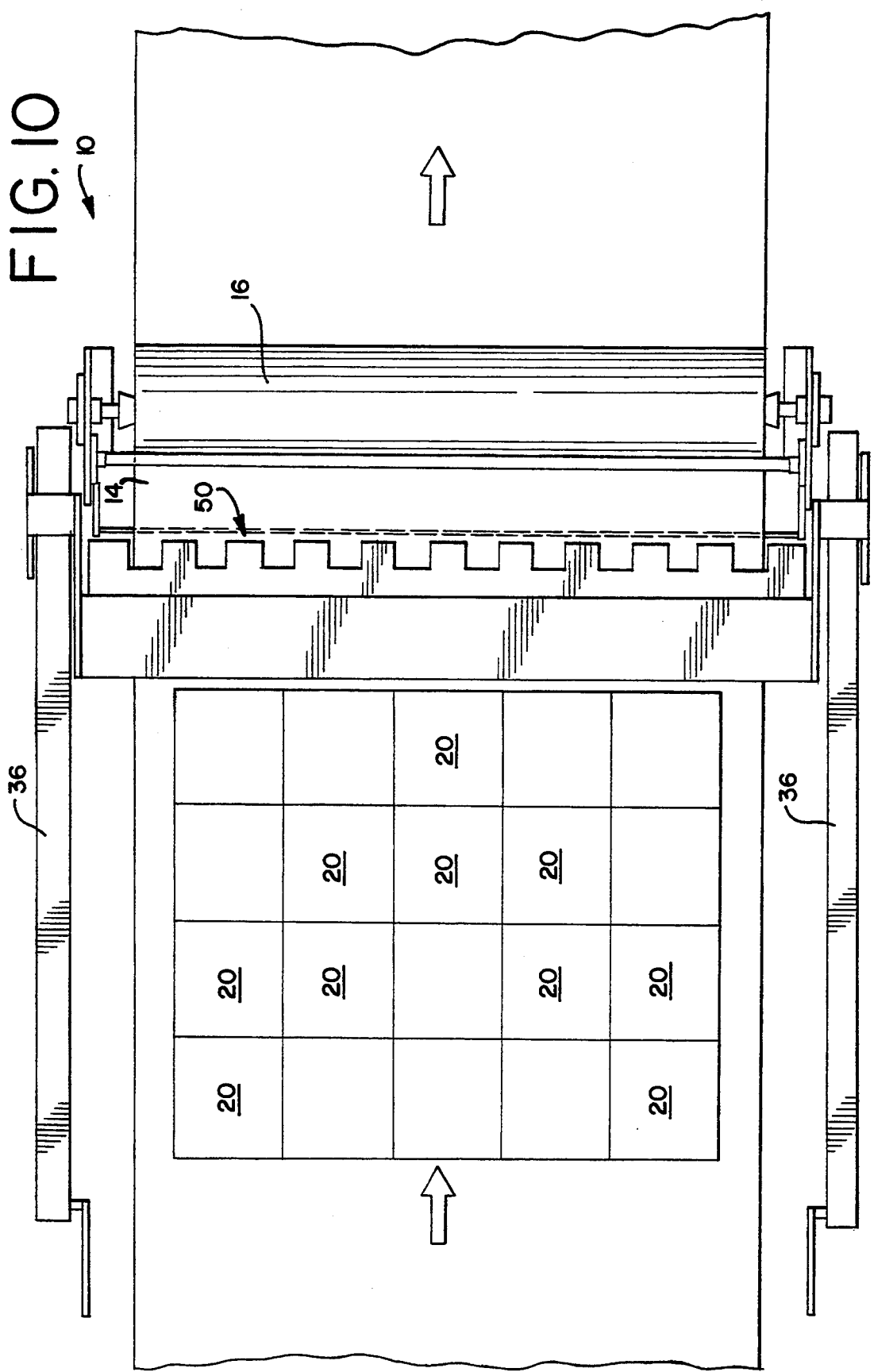

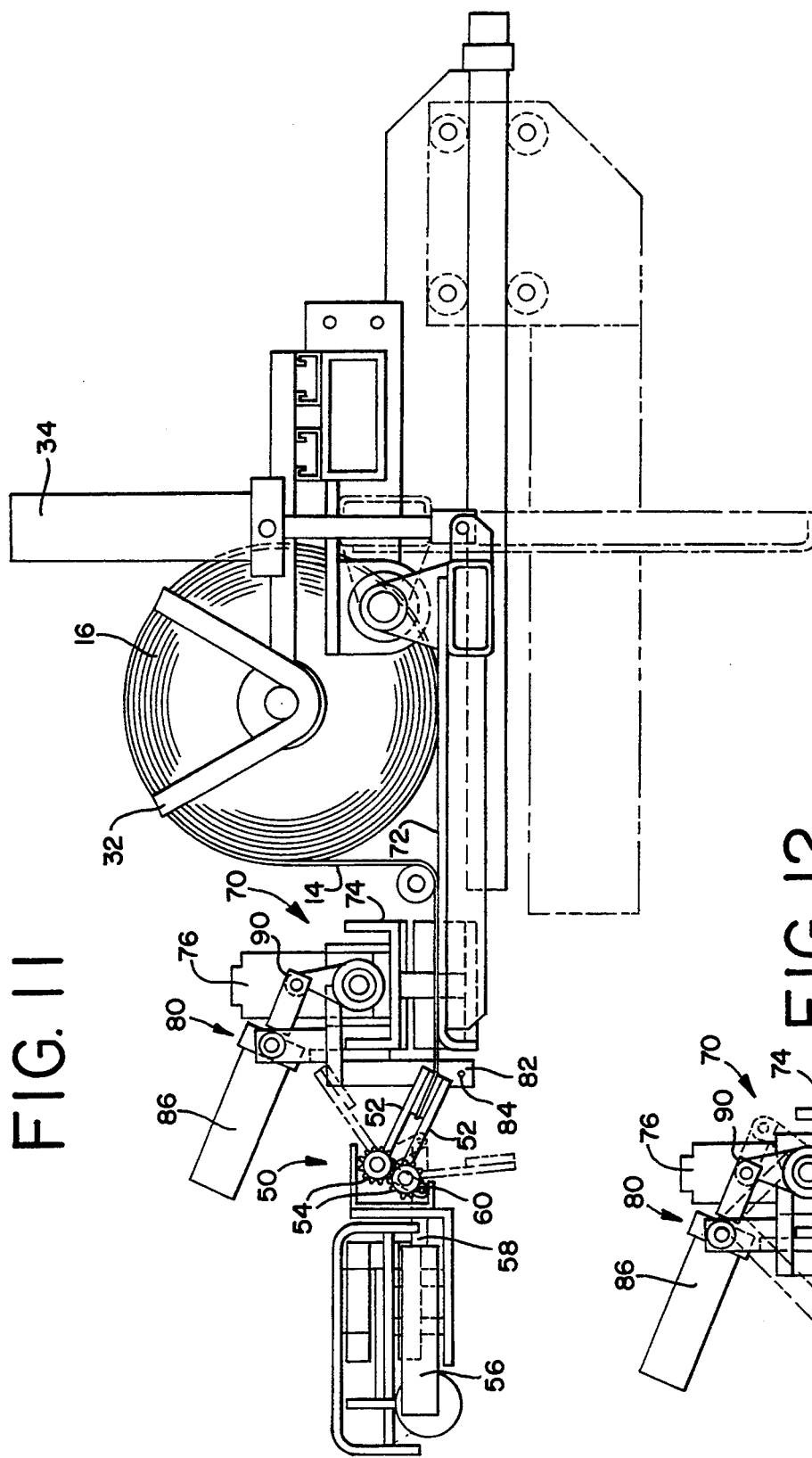

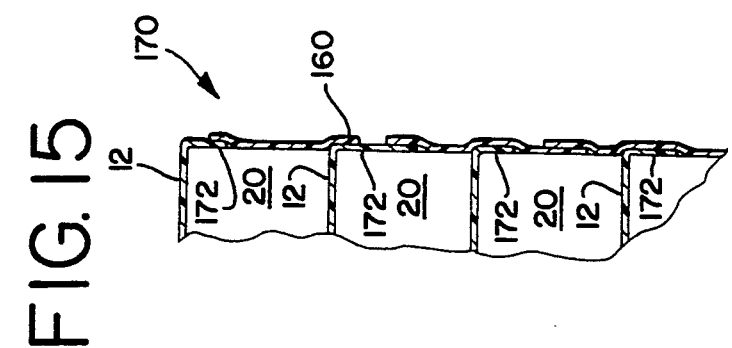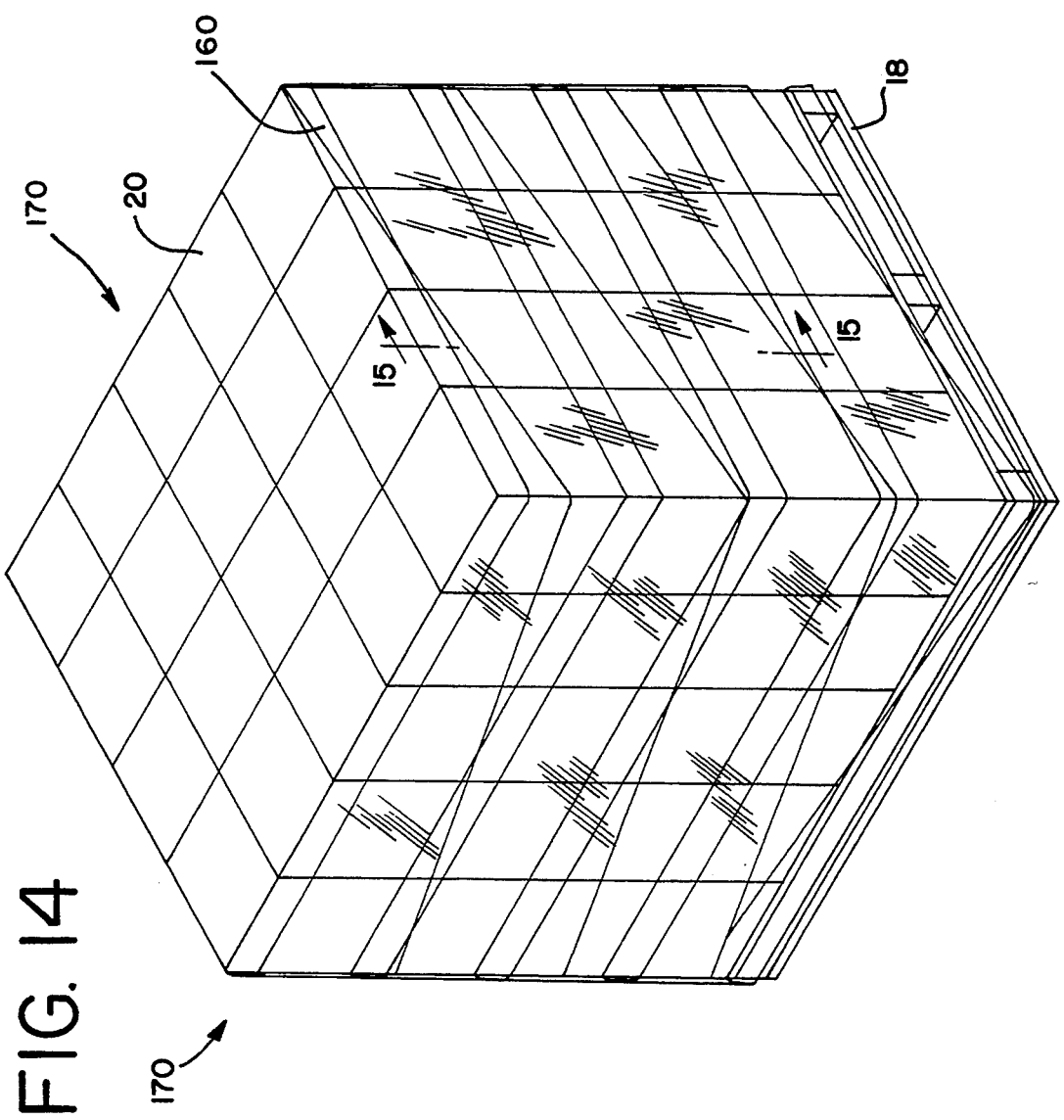

SHEET CUTTING AND PLACING APPARATUS, RELATED METHOD, AND RELATED PACKAGE

TECHNICAL FIELD OF THE INVENTION

This invention pertains to a novel apparatus and a related method for cutting a sheet from flexible film, such as stretch film, which is wound on a roll and for placing the sheet on a pallet or on a layer of one or more boxes on the pallet. This invention also pertains to a related package employing film sheets interposed respectively between the pallet and the lowermost layer of articles, and between the respective layers of articles and employing a film sheet wrapping the pallet and the stacked layers of articles in a spiral pattern enveloping draped portions of the interposed sheets. Polymeric film of a type known commonly as stretch film may be advantageously employed in the novel apparatus, in the related method, and in the related package.

BACKGROUND OF THE INVENTION

Commonly, boxes or other articles with planar top and bottom surfaces are stacked in successive layers on a pallet, as for storage or shipment. Automated palletizing equipment is employed in many instances for stacking the boxes or other articles in successive layers on the pallet. Strapping, stretch film, or other wrapping material may be later applied around the pallet and the stacked articles.

As a pallet carrying stacked boxes or other articles without strapping, stretch film, or other wrapping material is being moved by means of a fork lift or other equipment, the stacked articles have a tendency to tumble, particularly if the articles have been stacked in a columnar pattern wherein each article in every layer except the lowermost layer is stacked onto a single article in the underlying layer without bridging two or more such articles.

One known expedient for reducing the tendency of the stacked articles to tumble has been to stack the articles in a so-called brick pattern wherein each article in every layer except the lowermost layer is stacked so as to bridge two or more such articles in the underlying layer. However, where it is desired to employ automatic palletizing equipment, this expedient may not be entirely satisfactory because of the increased complexity of the required equipment.

Another known expedient therefor has been to insert a sheet of stiff paperboard, such as fiberboard or corrugated paperboard, between each layer of stacked articles and the overlying layer. The sheet may have tackified surfaces. This expedient, however, may also not be entirely satisfactory for all applications, since the sheets produce bulky waste when the stacked articles are removed, and since the sheets cover and occlude any pricing data, stock numbers, or other indicia on the top surfaces of the underlying articles.

There has therefore been a continuing need, to which this invention is addressed, for a better way to stabilize layers of stacked boxes or other articles on a pallet.

SUMMARY OF THE INVENTION

This invention provides a novel apparatus and a novel method related to the novel apparatus for cutting a sheet from flexible film wound on a roll of a predetermined width and for placing the sheet on a pallet or on a layer of one or more boxes on the pallet.

In the novel apparatus, means are provided for mounting a roll of the film so that the roll is rotatable about an axis. In addition, means are provided for releasably gripping the leading end of the film releasably and for pulling the gripped end longitudinally away from the roll so as to rotate the roll and unwind a portion of the film from the roll, and so as to cause at least a substantial part of the unwound portion of the film to extend over the pallet or over a layer of one or more boxes or other articles on the pallet.

Moreover, means are provided for releasably clamping the unwound portion of the film between the pallet and the roll and for cutting the clamped portion so as to cut a sheet having a predetermined length from the remaining film. The gripping, pulling, and releasing means are operative for releasing the gripped end after the sheet has been cut therefrom so as to permit the sheet to drop onto the pallet or onto a layer of one or more boxes or other articles on the pallet.

Preferably, the gripping, pulling, and releasing means are operative for pulling the sheet backwardly after the sheet has been cut from the remaining film and before the gripped end of the sheet is released. So as to facilitate placing a first sheet onto the pallet before any boxes or other articles are stacked, the gripping, pulling, and releasing means may also be operative for lowering the gripped end of the sheet toward the pallet before releasing the gripped end of the sheet.

This invention also provides a novel package comprising a pallet and stacked layers of boxes or other articles on the pallet. In the package, film sheets are interposed respectively between the pallet and the lowermost layer of articles and between the respective layers of articles. The interposed sheets have predetermined lengths such that portions of the film sheets are draped over at least two ends of the pallet or of the layers of articles beneath the film sheets. In the package, a film sheet is employed, the film sheet wrapping the pallet and the stacked layers of articles in a spiral pattern enveloping the draped portions of the interposed sheets.

BRIEF DESCRIPTION OF THE DRAWINGS

These and other objects, features, and advantages of this invention will be evident from the following description of a preferred embodiment of this invention with reference to the accompanying drawings, in which like reference characters designate like or corresponding parts throughout the several views, and wherein:

FIGS. 1 through 4 are schematic, side elevations of an apparatus constituting a preferred embodiment of this invention, at successive stages in its operation for cutting a first sheet from flexible film wound on a roll and for placing the first sheet onto a pallet.

FIGS. 5 through 8 are similar, side elevations of the same apparatus, as that shown in FIGS. 1–4, at successive stages in its operation for cutting a second sheet from the wound film and for placing the second sheet onto a layer of boxes on the pallet.

FIG. 9 is a similar, side elevation of the same apparatus, as that shown in FIGS. 1–8, at a later stage after five such sheets have been applied.

FIG. 10 is a schematic, plan view of the same apparatus as shown in FIG. 9.

FIG. 11, on a larger scale, is a schematic, side elevation of the same apparatus, as shown in FIGS. 1 and 5, wherein the pallet and the stacked boxes are not shown, and a gripping mechanism is shown schematically in a gripping condition by solid lines, and in a releasing position by broken lines.

FIG. 12, on a similar scale, is a detail taken from FIG. 11, wherein a clamping mechanism is shown in a clamping condition by solid lines, and in a releasing condition by broken lines.

FIG. 14 is a perspective view of a completely wrapped package formed in accordance with the principles of this invention.

FIG. 15 is a partial cross-sectional view of the package of FIG. 14 as taken along the lines 15—15 of FIG. 14.

DETAILED DESCRIPTION OF PREFERRED EMBODIMENT

Figure 13:
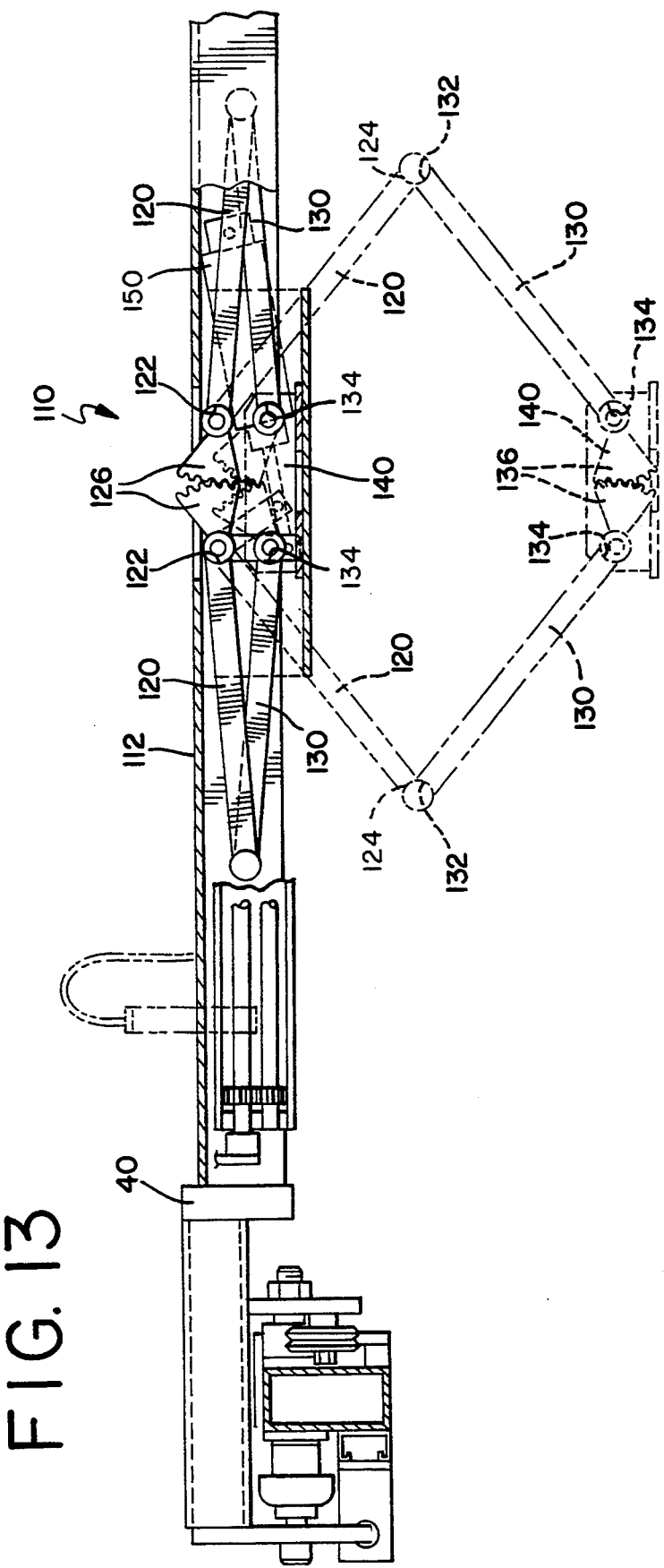
FIG. 13, on a similar scale, is a schematic, end elevation of the same apparatus, wherein a mechanism for raising and lowering the gripping mechanism is shown fragmentarily in a raised condition by solid lines and in a lowered condition by broken lines.

As shown in FIG. 1 and other views, an apparatus 10 constituting a preferred embodiment of this invention is designed for cutting a sheet 12 from stretch film 14 tackified on both expansive surfaces and wound on a roll 16, and for placing the sheet 12 on a pallet 18 or on a layer of one or more boxes 20 on the pallet 18. The film 14 wound on the roll 16 has a leading end 22 that may extend from the roll 16.

The pallet 18 is supported on a supporting structure (not shown) which is a component of an automated palletizing apparatus of a known type and outside the scope of this invention. The automated palletizing apparatus is operative in a known manner for positioning the pallet 18 at a series of successively lower levels, at which the pallet 18 is positioned to receive successively higher layers of the boxes 20, and for depositing the boxes 20 in the successive layers.

A cradle 30 having two generally V-shaped supports 32 and being adjustable vertically on two upright columns 34 is provided for mounting the roll 16 so that the roll 16 is rotatable about a transverse axis. One of the generally V-shaped supports 32 and one of the upright columns 34 are shown in FIGS. 1 and other views.

Two longitudinally extending beams 36 are provided, which extend forwardly from the cradle 30. Each of the beams 36 defines a track supporting one end of a wheeled carriage 40, which is movable forwardly and backwardly along the tracks defined by the beams 36. A motor (not shown) is provided for driving the carriage 40, along the tracks defined by the beams 36, forwardly to an initial position and backwardly to a final position, and through an intermediate position which is near the final position. The carriage 40 is shown in the initial position in FIG. 1, in the intermediate position in FIG. 2, and in the final position in FIG. 3.

The carriage 40 carries a mechanism 50 for gripping the leading end 22 of the film 14. As shown in FIG. 11, the gripping mechanism 50 comprises two gripping jaws 52 which are pivotable about transverse axes between an opened condition and a closed condition. The gripping jaws 52 are interconnected, by means of two intermeshed gears 54 arranged to rotate conjointly but oppositely so as to cause the gripping jaws 52 to pivot conjointly but oppositely, so as to be conjointly pivotable between the opened and closed conditions. The gripping mechanism 50 is adapted to grip the leading end 22 of the film 14 when the gripping jaws 52 are pivoted to the closed condition and to release the leading edge 22 of the film 14 when the gripping jaws 52 are pivoted to the opened condition.

The carriage 40 mounts a pneumatically operated piston-cylinder mechanism 56 including a piston rod 58 interconnected to the gears 54, by means of a lever 60 connected to the piston rod 58 and to one of the gripping jaws 52. The mechanism 56 is operative so as to cause the gripping jaws 52 to pivot into the closed condition as the piston rod 58 is extended and so as to cause the gripping jaws 52 to pivot into the opened condition as the piston rod 58 is retracted.

Thus, when the carriage 40 is moved forwardly from the initial position while the leading end 22 of the film 14 is gripped by the gripping jaws 52, the gripped end 22 is pulled longitudinally away from the roll 16. Initially, the carriage 40 is moved forwardly from the initial position to the intermediate position. Thus, a portion of the film 14 is unwound from the roll 16, which is caused to rotate on the cradle 30. Also, at least a substantial portion of the unwound portion of the film 14 is caused to extend over the pallet 18 or over a layer of boxes 20 on the pallet 18, whichever is uppermost.

As shown in FIGS. 11 and 12 and other views, a clamping mechanism 70 is operatively mounted near the cradle 30, between the cradle 30 and the pallet 18. A clamping table 72 is fixedly mounted below the clamping mechanism 70. The clamping mechanism 70 comprises a clamping platen 74, which extends transversely across the clamping table 72 and which is movable over a limited range of vertical movement between a raised position and a lowered position. The clamping mechanism 70 further comprises two similar pneumatically powered piston-cylinder mechanisms 76 (one shown in FIGS. 11 and 12) which are arranged to move the clamping platen 74 over the indicated range. In FIG. 12, the clamping platen 74 is shown in the raised position by solid lines and in the lowered position by broken lines.

The clamping mechanism 70 is arranged to clamp the film 14 between the clamping platen 74 and the clamping table 72 when the clamping platen 74 is lowered in the lowered position after a portion of the film 14 has been pulled from the roll 16 as described above. The clamping mechanism 70 is arranged to release the film 14 when the clamping platen 74 is raised in the raised position.

In a normal cycle of the apparatus 10, the clamping platen 74 is raised to the raised position after the leading end 22 of the film 14 has been gripped and remains in the raised position while the gripped end 22 of the film 14 is pulled longitudinally away from the roll 16, until the carriage has been moved forwardly from the initial position to the intermediate position. Thereupon, the clamping platen 74 is lowered to the lowered position to clamp the pulled film 14 and remains in the lowered position while the clamped film 14 is cut, as described below. After the clamped film 14 has been cut, the clamping platen 74 remains in the lowered position to clamp the film 14 remaining on the roll 16 until the leading end 22' of the film remaining on the roll 16, as seen in FIG. 3, has been gripped during the next cycle of the apparatus 10.

As shown in FIGS. 11 and 12 and other views, a cutting mechanism 80 is operatively mounted near the clamping mechanism 70, between the clamping mechanism 70 and the pallet 18. The cutting mechanism 80 comprises two similar levers 82 (one shown in FIGS. 11 and 12) which are pivotable about a transverse axis, an electrically heatable cutting wire 84 extending transversely and tautly between the levers 82, and two similar pneumatically powered piston-cylinder mechanisms 86 (one shown in FIGS. 11 and 12) each of which has a piston rod (not shown) connected to one of the levers 82, by means of a crank linkage 90.

The piston-cylinder mechanisms 86 are actuatable to move the cutting wire 84 along an arcuate path defined by the transverse axis of the pivotable levers 82, between a lowered position and a raised position, while the film 14 pulled from the roll 16 is clamped between the clamping platen 74 and the clamping table 72. In the lowered position, in which the cutting wire 84 is shown by solid lines in FIG. 12, the cutting wire 84 is disposed below the film 14 pulled from the roll 16. In the raised position, in which the cutting wire 84 is shown by dashed lines in FIG. 12, the cutting wire 84 is disposed above the film 14 pulled from the roll 16. The cutting mechanism 80 is arranged to heat the cutting wire 84 electrically while the cutting wire 84 is moved from the lowered position to the raised position so that the cutting wire 84 can cut a sheet 12 of the film 14 from the film 14 remaining on the roll 16.

After a sheet 12 of the film 14 has been cut from the film 14 remaining on the roll 16, the gripped end 22 may then be regarded as the gripped end 22 of the sheet 12. Thereupon, while the gripping mechanism 50 continues to grip the gripped end 22 of the sheet 12, the carriage 40 is moved forwardly from the intermediate position to the final position. Thus, the sheet 12 is pulled backwardly so as to cover the pallet 18 or so as to cover a layer of boxes 20 on the pallet 18, whichever is uppermost. If the pallet 18 is uppermost, a mechanism 100 to be described next is employed to lower the gripping mechanism 50 and the gripped end 22 of the sheet 12 toward the pallet 18 before the gripped end 22 is released.

The mechanism 100 comprises two similar linkages 110 (one shown in FIG. 13) spaced transversely from each other along a transversely extending beam portion 112 of the carriage 40. The linkages 110 operate similarly and conjointly.

Each linkage 110 comprises two upper links 120 and two lower links 130. Each upper link 120 has an upper end 122 pivotally mounted to the beam portion 112 for pivoting about a longitudinal axis, a lower end 124, and a partial gear 126 mounted upon the upper end 122 so as to be conjointly pivotable with such upper link 120. Each lower link 130 has an upper end 132 pivotally mounted to the lower end 124 of one of the upper links 120, a lower end 134 pivotally mounted to an associated flange 140 extending upwardly from the gripping mechanism 50, and a partial gear 136 mounted upon the lower end 134 so as to be conjointly pivotable with such lower link 130. Each linkage 110 is associated with such a flange 140.

The partial gears 126 of the upper links 120 are intermeshed and the partial gears 136 of the lower links 130 are intermeshed. Thus, the upper links 120 are pivotable conjointly but oppositely and the lower links 130 are pivotable conjointly but oppositely between a condition wherein the associated flange 140 is raised, as shown by solid lines in FIG. 13, and a condition wherein the associated flange 140 is lowered, as shown by broken lines in FIG. 13.

A pneumatically powered piston-cylinder mechanism 150 having a piston rod 152 is associated with each of the similar linkages 110. The piston rod 152 thereof is pivotably coupled to a lever 154, which is connected to one of the upper links 120 of the associated linkage 110. Thus, the respective links of the associated linkage 110 are pivoted conjointly to the condition wherein the associated flange 140 is raised when the piston rod 152 is extended. Also, the respective links of the associated linkage 110 are pivoted conjointly to the condition wherein the associated flange is lowered when the piston rod 152 is retracted.

The mechanism 100 is operative to lower the gripping mechanism 50, as described above, if the pallet 18 is uppermost when the sheet 12 is pulled backwardly to the final position. However, if a layer of boxes 20 on the pallet 18 is uppermost when the sheet 12 is pulled backwardly to the final position, the mechanism 100 is not operated.

After the sheet 12 has been pulled back to the final position, and after the gripping mechanism 50 has been lowered if the gripping mechanism 50 is to be lowered, the gripping jaws 52 are pivoted to the opened condition so as to release the end 22 of the sheet 12. Therefore, the sheet 12 is permitted to drop onto the pallet 18 or onto the layer of the boxes 20 on pallet 18, whichever is uppermost. Preferably, the sheet 12 has a predetermined length such that portions of the sheet 12 are draped downwardly over the ends of the pallet 18 or over the ends of the layer of boxes 20, whichever is covered by the sheet 12. Preferably, the sheet 12 has a predetermined width such that portions of the sheet 12 are draped downwardly over the sides of the pallet 18 or over the sides of the layer of boxes 20, whichever is covered by the sheet 12.

Preferably, after the respective sheets 12 have been applied over the pallet 18 and between the respective layers of boxes 20 stacked on the pallet 18, the pallet 18, the applied sheets 12, and the stacked boxes 20 are conveyed from the apparatus 10 to a downstream location and are wrapped with a long sheet 160 of similar film in a spiral pattern enveloping the draped portions of the applied sheets 12 as shown in FIG. 14. A unique package 170 results, in which the downwardly draped portions 172 of the applied sheets 12 and the wrapping sheet 160 are interengaged, so as to stabilize the stacked boxes 20 on the pallet 18 as shown in FIG. 15.

Various modifications may be made in the preferred embodiment described above without departing from the scope and spirit of this invention. It is therefore to be understood that within the scope of the appended claims, the present invention may be practiced otherwise than as specifically described herein.

I claim:

1. Apparatus for cutting a sheet of film from a supply of flexible film wound upon a roll and for placing said sheet of film upon a pallet or upon a layer of one or more boxes or other articles disposed upon said pallet, wherein said wound film has a leading end, comprising:

means for mounting a roll of film so that said roll of film is rotatable about an axis;

means for releasably gripping a leading end portion of said film wound upon said roll of film, wherein said gripping means is movable longitudinally away from said roll of film so as to pull said gripped leading end portion of said film longitudinally away from said roll of film and thereby rotate said roll of film so as to unwind a portion of said film from said roll of film and thereby cause at least a substantial part of said unwound portion of said film to extent over said pallet or over a layer of one or more boxes or other articles disposed upon said pallet in a suspended mode whereby said unwound portion of said film is only supported, at its opposite ends, by said movable gripping means and said roll of film;

means for releasably clamping said unwound portion of said film at said end of said unwound portion of said film disposed adjacent to said roll of film, and for cutting said clamped end portion of said film so as to cut a sheet of film having a predetermined length from the film remaining upon said roll of film; and means for adjustably mounting said gripping means between a lowered position and a raised position with respect to said pallet or said layer of one or more boxes or other articles disposed upon said pallet, respectively, whereby upon releasing said gripped end of said film from said gripping means after said sheet has been cut from said roll of film, said sheet of film is permitted to drop down onto said pallet or onto a layer of one or more boxes or other articles disposed upon said pallet.

2. The apparatus of claim 1, wherein:
said gripping means is operative for pulling said sheet away from said remaining film after said sheet has been cut and before said gripped end of said sheet has been released.

3. The apparatus of claim 2, wherein:
said gripping means is operative for lowering said gripped end of said sheet toward said pallet before releasing said gripped end of said sheet.

4. Apparatus as set forth in claim 1, wherein:
said gripping means comprises a pair of relatively pivotable jaws.

5. Apparatus as set forth in claim 1, wherein:
said clamping means comprises a clamping table fixedly disposed adjacent to said roll of film, and a clamping platen relatively movable with respect to said clamping table between open and closed positions.

6. Apparatus as set forth in claim 5, wherein:
said cutting means comprises a cutting wire operatively mounted adjacent to said clamping table.

7. Apparatus as set forth in claim 6, wherein:
said cutting wire comprises an electrically heatable cutting wire.

8. Apparatus as set forth in claim 6, wherein:
said cutting wire is pivotably mounted adjacent to said clamping table so as to be movable between a first position disposed beneath said film suspended between said gripping means and said clamping means, and a second position disposed above said film suspended between said gripping means and said clamping means,
whereby upon movement of said cutting wire from said first position to said second position, said cutting wire cuts said film suspended between said gripping means and said clamping means.

9. Apparatus as set forth in claim 1, further comprising:
a pair of parallel beams, defining a vehicle track, disposed above said pallet; and
a carriage movably mounted upon said vehicle track defined by said pair of beams for movement between a first position adjacent to said roll of film and a second position remote from said roll of film, said gripping means being mounted upon said carriage.

10. A method for cutting a sheet of film from a supply of flexible film wound upon a roll of film, and for placing said cut sheet of film upon a pallet or upon a layer of one or more boxes or articles disposed upon said pallet, the wound film having a leading end, comprising the steps of:

mounting said roll of film so that said roll of film is rotatable about an axis;

releasably gripping said leading end of said wound film by gripping means;

pulling said gripped leading end of said film longitudinally away from said roll of film so as to rotate said roll of film and thereby unwind a portion of said film from said roll of film so as to cause at least a substantial part of said unwound portion of said film to extend over said pallet or over a layer of one or more boxes or other articles disposed upon said pallet in a suspended mode whereby said unwound portion of said film is only supported, at its opposite ends, by said gripping means and said roll of film;

releasably clamping said unwound portion of said film at said end of said unwound portion of said film disposed adjacent to said roll of film;

cutting said clamped end portion of said film so as to cut a sheet of film having a predetermined length from the film remaining upon said roll of film;

adjusting said gripping means between a lowered position and a raised position with respect to said pallet or said layer of one or more boxes or other articles disposed upon said pallet, respectively, so as to properly position said cut sheet of film with respect to said pallet or said layer of one or more boxes or other articles disposed upon said pallet; and releasing said gripped end of said sheet after said sheet has been cut from said roll of film and positionally adjusted with respect to said pallet or said one or more boxes or other articles disposed upon said pallet so as to permit said sheet to drop down onto said pallet or onto a layer of one or more boxes or other articles disposed upon said pallet.

11. The method of claim 10, further comprising the step of:
pulling said sheet away from said remaining film after said sheet has been cut and before said gripped end of said sheet has been released.

12. The method as set forth in claim 10, wherein:
said cutting of said clamped end portion of said film is performed by moving a cutting wire from one side of said film, suspended between said gripped leading end of said unwound film and said clamped end of said film, to an opposite side of said film.

13. The method as set forth in claim 12, wherein:
said cutting wire is an electrically heatable cutting wire; and
said cutting wire is heated while said cutting wire is moved from said one side of said film to said opposite side of said film so as to cut said film.

14. The method as set forth in claim 12, wherein:
said cutting of said clamped end portion of said film is performed by pivotally moving said cutting wire from a first position disposed beneath said film suspended between said gripped leading end of said unwound film and said clamped end of said film, to a second position disposed above said film suspended between said gripped leading end of said unwound film and said clamped end of said film.

15. The method as set forth in claim 10, further comprising the steps of:
   providing a pair of parallel beams, defining a vehicle track, above said pallet;
   mounting gripping means, for releasably gripping said leading end of said wound film, upon a carriage; and
   moving said carriage along said parallel beams defining said vehicle track so as to pull said gripped leading end of said film away from said roll of film.

16. The method as set forth in claim 10, wherein:
   said releasable gripping of said leading end of said wound film is performed by opening and closing a pair of relatively pivotable jaws.

17. The method as set forth in claim 10, wherein:
   said releasable clamping of said film at said end of said unwound portion of said film disposed adjacent to said roll of film is performed by moving a clamping platen toward and away from a clamping table fixedly disposed adjacent to said roll of film.

* * * * *